(12) United States Patent
Kim (10) Patent No.: US 11,308,805 B2
(45) Date of Patent: Apr. 19, 2022

(54) PARKING SPACE NOTIFICATION DEVICE AND METHOD

(71) Applicant: MANDO MOBILITY SOLUTIONS CORPORATION, Gyeonggi-do (KR)

(72) Inventor: Nac Dong Kim, Gyeonggi-do (KR)

(73) Assignee: MANDO MOBILITY SOLUTIONS CORPORATION, Gyeonggi-do (KR)

( * ) Notice: Subject to any disclaimer, the term of this patent is extended or adjusted under 35 U.S.C. 154(b) by 0 days.

(21) Appl. No.: 16/747,549

(22) Filed: Jan. 21, 2020

(65) Prior Publication Data

US 2020/0250977 A1 Aug. 6, 2020

(30) Foreign Application Priority Data

Feb. 1, 2019 (KR) .......................... 10-2019-0013467

(51) Int. Cl.
*G08B 21/00* (2006.01)
*G08G 1/14* (2006.01)

(52) U.S. Cl.
CPC .................................. *G08G 1/143* (2013.01)

(58) Field of Classification Search
CPC ........ G08G 1/143; G08G 1/148; G08G 1/168; G06K 9/00812; B60W 30/08; B60W 2420/42; B60W 2420/52; B62D 15/0285
USPC ..................................................... 340/932.2
See application file for complete search history.

(56) References Cited

U.S. PATENT DOCUMENTS

| | | | | |
|---|---|---|---|---|
| 5,432,508 A * | 7/1995 | Jackson | .................... | E04H 6/42 340/932.2 |
| 2005/0035879 A1 * | 2/2005 | Gotzig | ................... | B60Q 9/006 340/932.2 |
| 2005/0083212 A1 * | 4/2005 | Chew | ....................... | G08G 1/14 340/932.2 |
| 2007/0055446 A1 * | 3/2007 | Schiffmann | ........... | G01S 7/4026 701/301 |
| 2008/0177443 A1 * | 7/2008 | Lee | .................... | B62D 15/0285 701/41 |
| 2009/0167564 A1 * | 7/2009 | Long-Tai | ........... | B62D 15/0285 340/932.2 |
| 2014/0347196 A1 * | 11/2014 | Schulz | ............. | G08G 1/096791 340/932.2 |

(Continued)

FOREIGN PATENT DOCUMENTS

KR 10-2018-0066612 6/2018

*Primary Examiner* — Mark S Rushing
(74) *Attorney, Agent, or Firm* — Ladas & Parry, LLP (57) ABSTRACT

The present invention relates to a parking space notification device and method. The parking space notification device for checking parking sections and a parking space, which includes image sensors each configured to detect a parking section and a parking space using images, distance detection sensors each configured to detect a parking section and a parking space using distances to obstacles, a controller configured to process information about all of the parking sections and the parking spaces by using information about the parking section and information about the parking space which are detected by at least one of the image sensors or the distance detection sensors, and a memory storing information data about all of the parking sections and the parking space, which is processed by the controller. The controller detects a parking or leaving event using the image sensors and updates the information data stored in the memory when the event occurs.

14 Claims, 4 Drawing Sheets

(56) References Cited

U.S. PATENT DOCUMENTS

| | | | | |
|---|---|---|---|---|
| 2015/0138001 A1* | 5/2015 | Davies | ................ | G08G 1/0175 |
| | | | | 340/932.2 |
| 2015/0344028 A1* | 12/2015 | Gieseke | ............... | B62D 15/028 |
| | | | | 701/1 |
| 2017/0294121 A1* | 10/2017 | Jain | ........................ | G08G 1/146 |
| 2018/0093664 A1* | 4/2018 | Kim | ..................... | B60W 10/20 |

* cited by examiner

PARKING SPACE NOTIFICATION DEVICE AND METHOD

CROSS-REFERENCE TO RELATED APPLICATION

This application claims priority to and the benefit of Korean Patent Application No. 10-2019-0013467, filed on Feb. 1, 2019, the disclosure of which is incorporated herein by reference in its entirety.

BACKGROUND

1. Field of the Invention

The present invention relates to a parking space notification device and method, and more particularly, to a parking space notification device and method for continuously checking a parking space using leaving or entering information of a vehicle after searching for the parking space.

2. Discussion of Related Art

Generally, autonomous or semi-autonomous driving vehicles include a function of checking a parking space and performing autonomous parking. Typically, the autonomous or semi-autonomous driving vehicles include a technical configuration that obtains information about a space available for parking while passing between parking spaces and additionally performs parking by controlling steering, driving, braking, and shifting as necessary according to a size of the corresponding space and information about obstacles.

In the conventional parking system, when a driver activates a parking system of a vehicle for use, the parking system of the vehicle allows the driver to recognize a parking space which is ahead in a driving direction or is at a location at which the vehicle has already passed, or, when autonomous driving is performed, perceives a space of the corresponding parking space to perform parking.

In this case, the parking system provides the driver with information about the parking space which is at the location the vehicle has already passed, and the driver moves the vehicle to the corresponding parking space. However, when another vehicle has already been parked in the corresponding parking space, reliability of the parking system may be lowered.

PATENT DOCUMENT

Korean Patent Registration No. 10-2018-0066612A1

SUMMARY OF THE INVENTION

The present invention is directed to providing a parking space notification device and method for checking information about leaving or entering of a vehicle after searching for a parking section and updating the found parking section and space information.

According to an aspect of the present invention, there is provided a parking space notification device for checking parking sections and a parking space which includes image sensors each configured to detect a parking section and a parking space using images, distance detection sensors each configured to detect a parking section and a parking space using distances to obstacles, a controller configured to process information about all of the parking sections and the parking space by using information about the parking section and information about the parking space which are detected by at least one of the image sensors or the distance detection sensors, and a memory storing information data about all of the parking sections and the parking spaces, which is processed by the controller. The controller detects a parking or leaving event through the image sensors and updates the information data stored in the memory when the event occurs.

The parking space notification device may further include an input unit configured to receive a command for checking the parking space from a driver, and a display unit configured to display the parking section and the parking space available for parking under control of the controller which receives the command for checking the parking space.

The parking space notification device may further include an autonomous parking controller configured to autonomously park a vehicle in the parking space by controlling steering, driving, braking, and shifting according to the information about the parking section and the information about the parking space, which are stored in the memory, when an autonomous parking command is input through the input unit.

The image sensors may be one or more sensors selected from among cameras, radars, and light detection and ranging (LIDAR) sensors.

The distance detection sensors may be ultrasonic sensors and detect the parking section and the parking space by detecting the distances to the obstacles and intervals between the obstacles.

According to another aspect of the present invention, there is provided a parking space notification method for detecting a parking section and a parking space and guiding a driver on the detected parking section and the detected parking space, which includes the steps of a) detecting a parking section and a parking space available for parking using at least one of image sensors or distance detection sensors, b) storing information data about the parking section and the parking space in a memory, and c) determining whether a parking or leaving event of another vehicle occurs through the image sensors and updating the information data about the parking section and the parking space, which is stored in the memory, when the event occurs.

The parking space notification method may further include, after step b) or c), when the driver requests a parking space check, making an image of the information data about the parking section and the parking space, which is stored in the memory, and displaying the image on a display unit.

In step c), whether the another vehicle is parking or leaving may be determined using a vehicle body of the another vehicle or a trajectory of light.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, a parking space notification device and method of the present invention will be described in detail with reference to the accompanying drawings.

Embodiments of the present invention are provided to fully explain the invention for those skilled in the art. The embodiments described below may be modified in many different forms and the scope of the present invention is not limited to the embodiments to be described below. Rather, the embodiments are provided so that the present invention is more thorough and complete and fully conveys the concept of the present inventive to those skilled in the art.

The terminology used herein is for the purpose of describing particular embodiments only and is not intended to limit the scope of the invention. As used herein, the singular forms "a" and "an" are intended to include the plural forms as well, unless the context clearly indicates otherwise. It will be further understood that the terms "comprise," "comprising," "include," and/or "including," when used herein, specify the presence of stated shapes, integers, steps, operations, members, elements, and/or groups thereof, but do not preclude the presence or addition of one or more other shapes, integers, steps, operations, members, elements, and/or groups thereof. As used herein, the term "and/or" includes any and all combinations of one or more of the associated listed items.

It is clear that, although the terms "first," "second," etc. may be used herein to describe various members, regions, and/or portions, these members, regions, and/or portions should not be limited by these terms. These terms do not imply any particular order, up or down, or superiority, and are only used to distinguish one member, region, or portion from another member, region, or portion. Therefore, a first member, region, or portion described below may refer to a second member, region, or portion without leaving from the teachings of the present invention.

Hereinafter, embodiments of the present invention will be described with reference to the accompanying drawings that schematically illustrate the embodiments of the present invention. In the drawings, for example, variations in the illustrated shape may be expected depending on manufacturing techniques and/or tolerances. Therefore, the embodiments of the present invention should not be construed as limited to the specific shapes of the regions illustrated herein, but should include, for example, changes in shape resulting from manufacturing.

Figure 1:
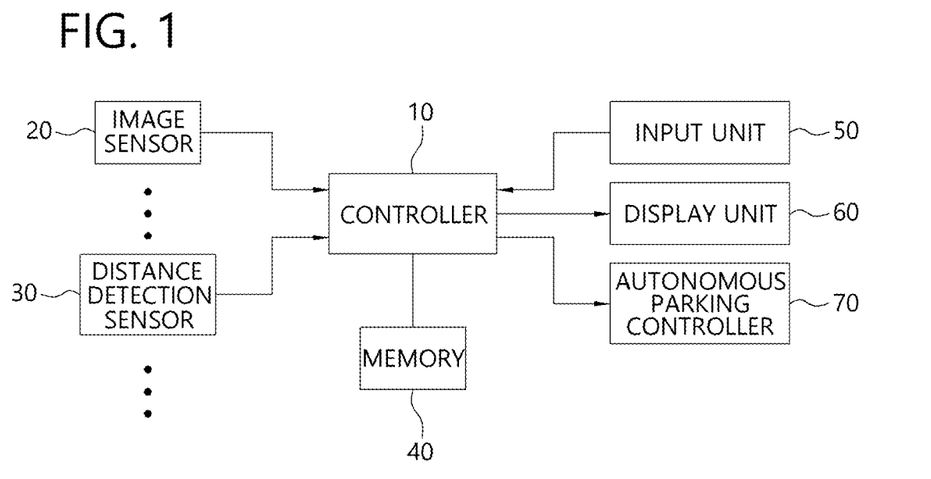
FIG. 1 is a configuration diagram of a parking space notification device according to an exemplary embodiment of the present invention.

FIG. 1 is a configuration diagram of a parking space notification device according to an exemplary embodiment of the present invention.

Referring to FIG. 1, the parking space notification device of the present invention includes a plurality of image sensors 20 which search for a parking section and a parking space and detect an event occurring in the found parking space, a plurality of distance detection sensors 30 which search for a parking space, a controller 10 which analyzes information about the parking section and the parking space detected by the image sensors 20 and the distance detection sensors 30 and applies the event detected by the image sensors 20, a memory 40 which stores the information about the parking space of the controller 10 and stores the information about the parking space updated according to occurrence of an event, an input unit 50 which receives a control command from a driver, a display unit 60 which displays the information about the parking space stored in the memory 40 in response to the control command input by the driver through the input unit 50, and an autonomous parking controller 70 which controls autonomous parking according to the information about the parking space stored in the memory 40 in response to the control command input by the driver through the input unit 50.

Hereinafter, a configuration and operation of the parking space notification device according to the exemplary embodiment of the present invention configured as described above will be described in more detail.

First, the image sensors 20 and the distance detection sensors 30 are installed outside the vehicle to obtain images in front, rear, and both side directions of the vehicle and detect information about a distance to an object.

Parking section lines may be detected from the images captured by the image sensors 20 and it is possible to determine whether there is another vehicle or obstacle in the parking section lines.

A distance to another vehicle or obstacle may be checked using the distance detection sensors 30.

Figure 2:
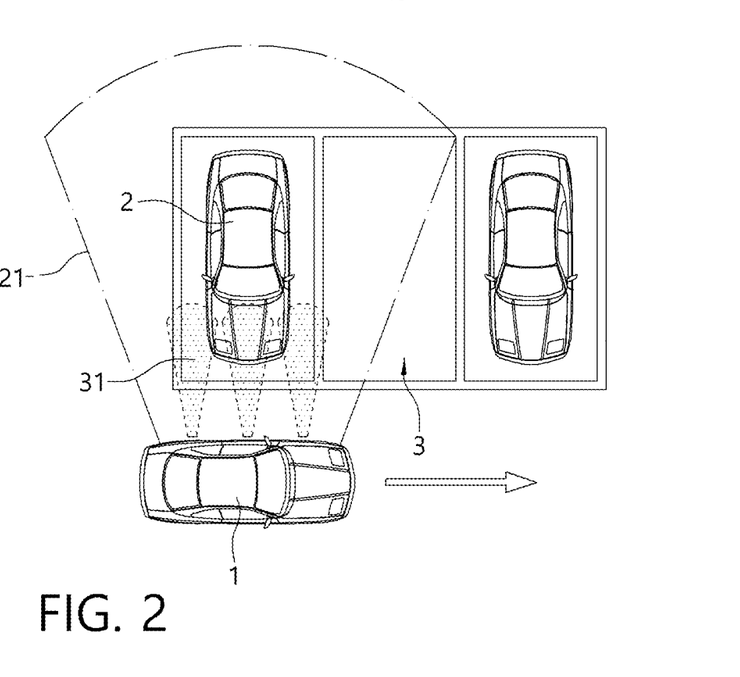
FIG. 2 is an explanatory diagram for describing detection of a parking section and a parking space using image sensors and distance detection sensors in the present invention.

FIG. 2 is an explanatory diagram for describing detection of a parking section and a parking space using image sensors 20 and distance detection sensors 30 in the present invention.

Referring to FIG. 2 when a vehicle 1 drives in a parking lot, the vehicle 1 may detect a parking section and a parking space using the image sensors 20 and the distance detection sensors 30 provided on sides of the vehicle 1.

Here, the "parking section" is defined as a region defined by parking section lines drawn on a bottom of a parking lot, and the "parking space" is defined as a region available for parking in the parking section.

The image sensors 20 may include at least one of cameras, radars, and light detection and ranging (LIDAR) sensors. The distance detection sensors 30 may include at least one of ultrasonic sensors and optical sensors.

A photographing region 21 photographed by the image sensors 20 while the vehicle moves along the parking section partially overlaps distance measuring regions 31 photographed by the distance detection sensors 30, and the distance measuring region 31 has a characteristic of being a shorter distance from the side of the vehicle 1 than the photographing region 21.

When the vehicle 1 moves in a location adjacent to the parking section, the vehicle 1 may detect distances to other vehicles 2 parked in the distance measuring region 31, which is a region detected by the distance detection sensor 30, to check the parking space.

However, when the vehicle 1 moves in a location spaced a length or more of the distance measuring region 31 from the parking section, the vehicle 1 may detect the parking space using the images in the photographing region 21, which are captured by the image sensors 20.

The image sensors 20 obtain the images and directly provide information about parking section lines, other parked vehicles, and a parking space available for parking.

Since the distance detection sensors 30 cannot detect the parking section lines, the distance detection sensor 30 detects a parking section using a distance between the detected obstacles. That is, the distance detection sensor 30 may determine whether a region corresponding to the distance between the obstacles is a region available for parking.

The images of the image sensors 20 and detection results of the distance detection sensors 30 are provided to the controller 10.

The controller 10 analyzes the parking section and the parking space using the images of the image sensor 20 or analyzes the parking section and the parking space by combining the images of the image sensors 20 and the detection results of the distance detection sensor 30.

As described above, the analyzed parking section and the analyzed parking space are stored in the memory 40.

Figure 3:
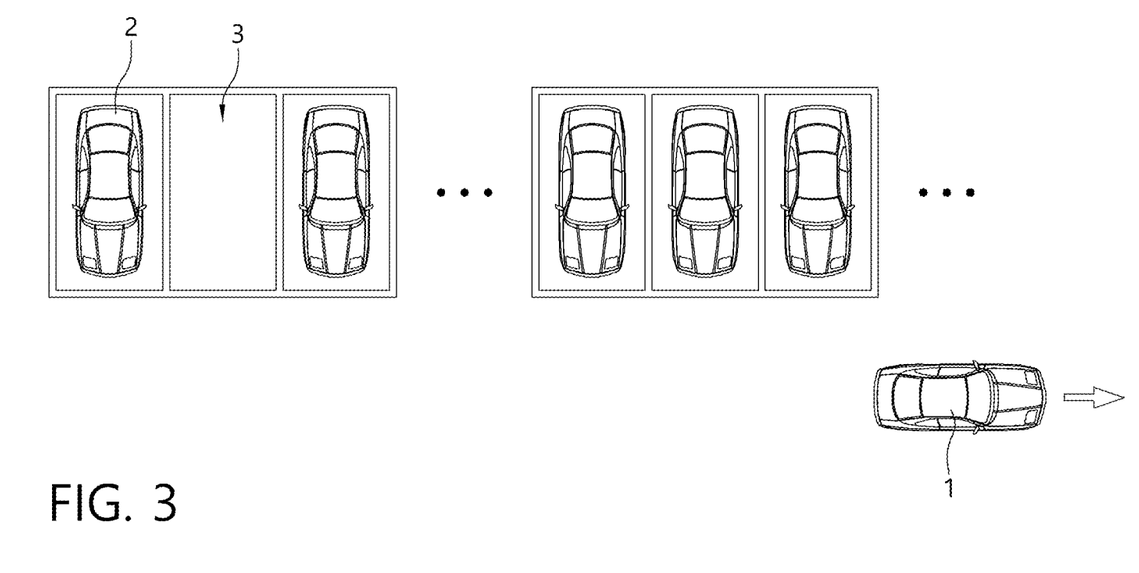
FIG. 3 is a schematic diagram of a state in which all parking sections are searched for and a parking space is checked.

FIG. 3 is a schematic diagram of a state in which all of the parking sections are searched for and the parking space is checked.

In such a state, when the driver inputs a control command for displaying location information about the parking space through the input unit 50, the controller 10 displays the location information using data stored in the memory 40 on the display unit 60.

In this case, a screen displayed on the display unit 60 may be an image of an actual image, which is obtained by editing the images captured by the image sensors 20, and may be displayed as an image, which simply shows parking section lines, whether another vehicle 2 is parked, and a parking space, on the basis of the captured images.

The driver may move the vehicle 1 according to information displayed on the display unit 60, thereby moving and parking the vehicle 1 to a parking space 3.

When the driver selects autonomous parking through the input unit 50, the controller 10 provides location information about the parking space 3 to the autonomous parking controller 70. In addition, the autonomous parking controller 70 may perform the autonomous parking by selectively controlling shifting, acceleration, deceleration, and steering depending on a situation.

Further, before the parking space is displayed or the autonomous parking is performed, the controller 10 uses the information detected by the image sensors 20 and the information detected by the distance detection sensors 30 to update the information about the parking section and the information detected by the parking space, which are stored in the memory 40.

Figure 4:
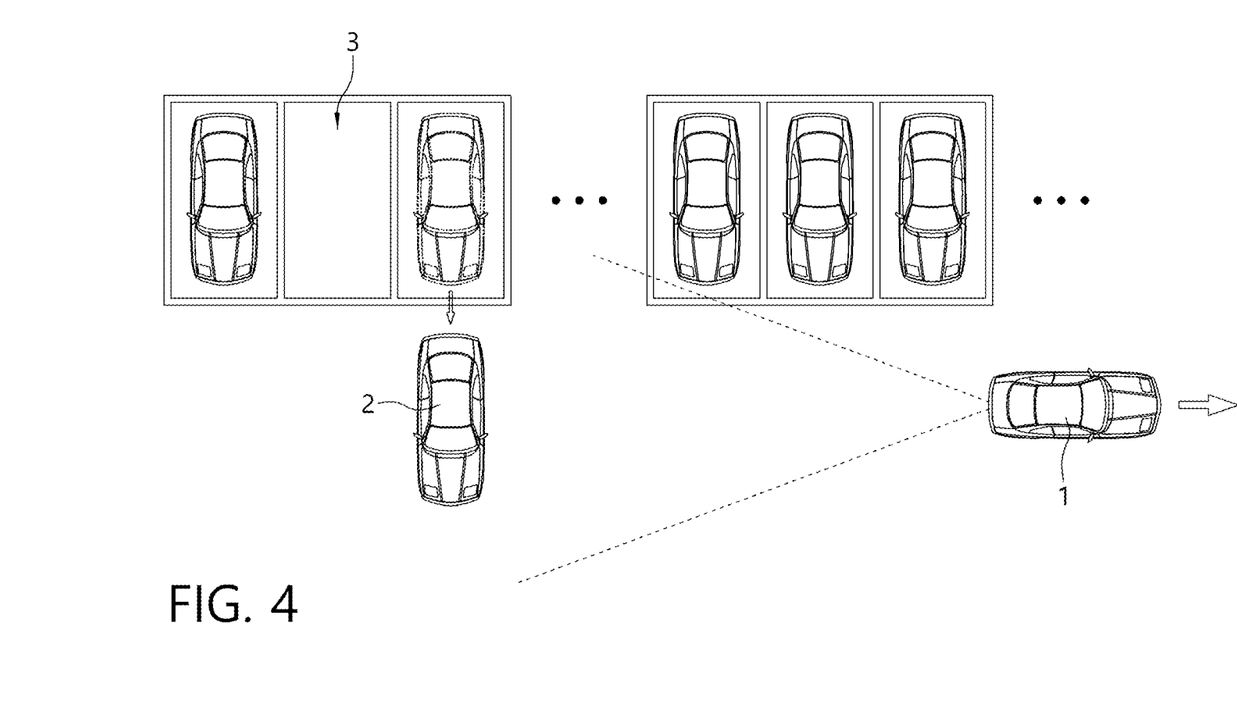
FIGS. 4 and 5 are schematic diagrams each illustrating a state in which an event occurs.

FIG. 4 illustrates a state in which another vehicle 2 leaves a parking section behind a vehicle 1. In this case, image sensors 20 mounted on a rear side of a vehicle 1 may detect the vehicle 2 leaving.

Figure 5:
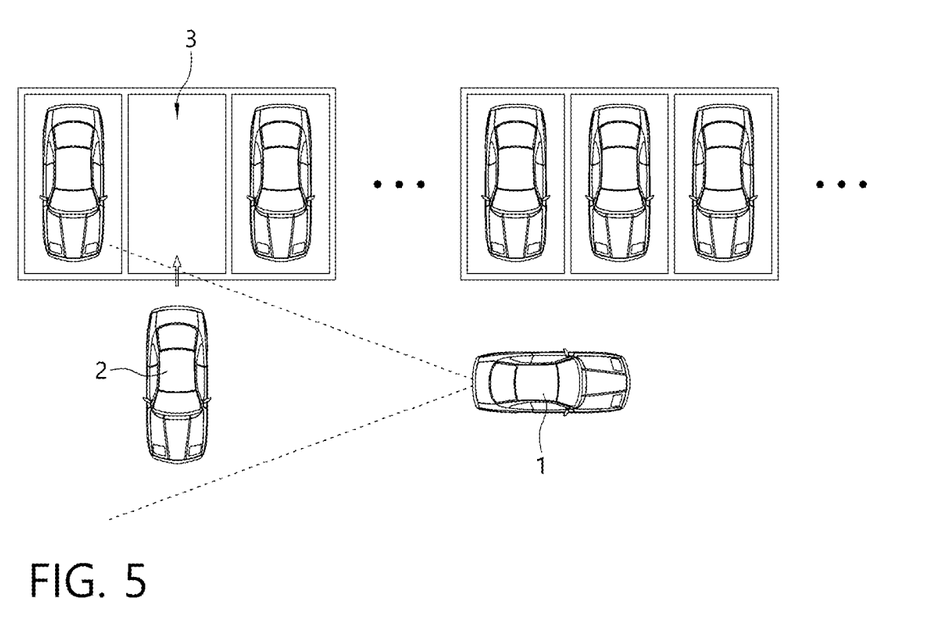

On the contrary, FIG. 5 illustrates a state in which another vehicle 2 enters (is parked in) a parking space 3. In this case, image sensors 20 mounted on a rear side of a vehicle 1 may also detect the vehicle 2 entering.

In this case, the image sensors 20 may detect a body itself of the vehicle 2 or detect light generated from a brake light, a headlamp, or a daytime running light of the vehicle 2 to determine whether the vehicle 2 leaves or is parked.

In the method of detecting the vehicle body or the light, a movement trajectory of the vehicle may be checked by detecting a movement direction of the body of the vehicle or the light at predetermined time intervals, and it may be determined whether the vehicle 2 leaves or enters (is parked) along the movement trajectory.

That is, the controller 10 may check a moving direction of the vehicle 2 by comparing image frames of the image sensors 20 and estimate a specific location of the parking section in the image of the image sensor 20 in consideration of a size of the vehicle 1.

When an event of entering (being parked) or leaving at the estimated position occurs, the controller 10 updates the information about the parking section and the information about the parking space, which are stored in the memory 40.

For example, as illustrated in FIG. 4, when it is detected by the image sensors 20 that the vehicle 2 parked in a parking section located on a right side of the parking space 3 leaves, the corresponding parking section is updated to a parking space 3 available for parking and stored in the memory 40.

As described above, in the state in which the information stored in the memory 40 is updated, when the driver inputs a control command for displaying location information of a parking space through the input unit 50, the controller 10 displays the location information on the display unit 60 using the data stored in the memory 40.

In this case, the fact that there are two parking spaces 3 adjacent to the vehicle 1 due to the vehicle 2 leaving is displayed on the screen displayed on the display unit 60.

The driver may move the vehicle 1 according to information displayed on the display unit 60, thereby moving and parking the vehicle 1 to one of the parking spaces 3.

When the driver selects autonomous parking through the input unit 50, the controller 10 provides location information of the parking space to the autonomous parking controller 70. Thereafter, the autonomous parking controller 70 may perform the autonomous parking by selectively controlling shifting, acceleration, deceleration, and steering depending on a situation. In this case, the driver may check the information about the parking section and the information about the parking space, which are updated due to the leaving of the vehicle 2, and designate the parking space for parking.

The display unit 60 may be a touch screen capable of inputting a command by a touch. The driver selects one of the parking spaces 3 displayed on the display unit 60 and the autonomous parking controller 70 performs the autonomous parking in the parking space 3 selected by the driver.

The selection of the parking space for parking may be performed using the input unit 50.

Further, as illustrated in FIG. 5, when it is detected by the image sensors 20 mounted on the rear side of the vehicle 1 that the vehicle 2 is parked in the parking space 3, the controller 10 updates the parking space 3 available for parking in the information about the parking section and the information about the parking space, which are currently stored in the memory 40, to a section unavailable for parking.

As described above, in the state in which the information stored in the memory 40 is updated, when the driver inputs a control command for displaying location information of the parking space through the input unit 50, the controller 10 displays the location information on the display unit 60 using the data stored in the memory 40.

That is, the controller 10 displays the information about the parking section and the information about the parking space to which the state in which the vehicle 2 is parked in the parking space 3 is reflected.

The updated information about the parking space may be provided to the driver in real time by displaying the information in this way, and thus reliability can be improved.

According to the present invention, after searching for a parking section and checking a parking space, information about the parking section and the parking space can be stored in a memory, and the information stored in the memory can be updated by continuously checking information on whether other vehicles enter or leave the corresponding parking section and space. Therefore, when a driver requests a parking space check, accurate information about the parking section and the space can be provided.

The present invention is not limited to the embodiments. It will be apparent to those skilled in the art that various modifications and alterations may be made without leaving from the technical scope of the present invention.

What is claimed is:

1. A parking space notification device for checking a parking section and a parking space, the parking space notification device comprising:
   image sensors each configured to generate data for images for detecting one or more parking spaces available for parking and one or more parking sections defined by parking section lines for defining the parking spaces;
   distance detection sensors each configured to detect distances associated with obstacles for detecting the parking sections and the parking spaces;
   a controller configured to process information about the parking sections and the parking spaces by using at least one of the data generated by the image sensors or the distances detected by the distance detection sensors; and
   a memory storing the information data about the parking sections and the parking spaces which is processed by the controller,
   wherein the controller is configured to detect the one or more parking sections using the image sensors based on the parking section lines included in one or more of the images generated by the image sensors, determine whether the detected one or more parking sections defined by the parking section lines are located from a host vehicle within or out of a predetermined measurement area, detect the one or more parking spaces available for parking using the distance detection sensors based on a distance between the obstacles when the detected one or more parking sections are located from the host vehicle within the predetermined measurement area, and detect the one or more parking spaces available for parking using the image sensors when the detected one or more parking sections are located from the host vehicle out of the predetermined measurement area.

2. The parking space notification device of claim 1, further comprising:
   an input unit configured to receive a command associated with the parking spaces from a driver; and
   a display unit configured to display the parking sections and the parking spaces available for parking in response to control of the controller which receives the command associated with the parking spaces.

3. The parking space notification device of claim 1, further comprising an autonomous parking controller configured to autonomously park a host vehicle in one of the parking spaces by controlling steering, driving, braking, and/or shifting according to the information about the parking sections and the parking spaces, which is stored in the memory, in response to an autonomous parking command.

4. The parking space notification device of claim 1, wherein the image sensors comprise one or more sensors selected from among cameras, radars, and light detection and ranging (LIDAR) sensors.

5. The parking space notification device of claim 1, wherein the distance detection sensors comprise ultrasonic sensors and are configured to detect the parking sections and the parking spaces by detecting the distances to the obstacles and intervals between the obstacles.

6. A parking space notification method for detecting a parking section and a parking space, the parking space notification method comprising:
   detecting one or more parking spaces available for parking and one or more parking sections defined by parking section lines for defining the one or more parking spaces using at least one of image sensors or distance detection sensors;
   storing information data about the parking sections and the parking spaces in a memory; and
   detecting the one or more parking sections using the image sensors based on the parking section lines included in one or more of the images generated by the image sensors, determining whether the detected one or more parking sections defined by the parking section lines are located from a host vehicle within or out of a predetermined measurement area, detecting the one or more parking spaces available for parking using the distance sensors based on a distance between the obstacles when the detected one or more parking sections are located from the host vehicle within the predetermined measurement area, and detecting the one or more parking spaces located from the host vehicle out of the predetermined measurement area.

7. The parking space notification method of claim 6, further comprising, in response to a request for a parking space check from a driver, generating an image of the information data about the parking sections and the parking spaces, which is stored in the memory, and displaying the generated image on a display.

8. The parking space notification method of claim 6, further comprising detecting one or more other vehicles' leaving movement from the parking spaces and parking movement of one or more other vehicles on the parking spaces,
   wherein the detecting of one or more other vehicles' leaving movement from the parking spaces and the parking movement of one or more other vehicles on the parking spaces, comprises detecting a vehicle body of the one or more other vehicles to detect the leaving movement from the parking spaces and the parking movement of one or more other vehicles on the parking spaces.

9. The parking space notification method of claim 6, further comprising detecting one or more other vehicles' leaving movement from the parking spaces and parking movement of one or more other vehicles on the parking spaces,
   wherein the detecting of one or more other vehicles' leaving movement from the parking spaces and the parking movement of one or more other vehicles on the parking spaces, comprises detecting a trajectory of light of the one or more other vehicles to detect the leaving movement from the parking spaces and the parking movement of one or more other vehicles on the parking spaces.

10. The parking space notification device of claim 1, wherein the controller is further configured to detect one or more other vehicles' leaving movement from the parking spaces located behind the host vehicle and the parking movement of one or more other vehicles on the parking spaces located behind the host vehicle, using the image sensors and update the information data about the parking sections and the parking spaces stored in the memory according to the detected leaving from the parking spaces or the detected parking of one or more other vehicles on the parking spaces.

11. The parking space notification method of claim 6, further comprising detecting one or more other vehicles' leaving movement from the parking spaces and parking movement of one or more other vehicles on the parking spaces,
  wherein the detecting of one or more other vehicles' leaving movement from the parking spaces and the parking movement of one or more other vehicles on the parking spaces, comprises detecting one or more other vehicles' leaving movement from the parking spaces located behind the host vehicle and the parking movement of one or more other vehicles on the parking spaces located behind the host vehicle, using the image sensors and updating the information data about the parking sections and the parking spaces stored in the memory according to the detected leaving movement from the parking spaces or the detected parking movement of one or more other vehicles on the parking spaces.

12. The parking space notification device of claim 1, wherein the image sensors facing the rear of the host vehicle generating the plurality of the images to be compared with each other to detect one or more other vehicles' leaving movement from the parking spaces and parking movement of one or more other vehicles on the parking spaces are mounted to the host vehicle.

13. The parking space notification device of claim 1, wherein the controller is configured to detect one or more other vehicles' leaving movement from the parking spaces and parking movement of one or more other vehicles on the parking spaces by comparing a plurality of the images generated by at least one or more image sensors facing rear of a host vehicle among the image sensors and update the information data about the parking sections and the parking spaces stored in the memory according to the detected leaving movement from the parking spaces or the detected parking movement of one or more other vehicles on the parking spaces.

14. The parking space notification method of claim 6, further comprising detecting one or more other vehicles' leaving movement from the parking spaces and parking movement of one or more other vehicles on the parking spaces by comparing a plurality of the images generated by at least one or more image sensors facing rear of a host vehicle among the image sensors and updating the information data about the parking sections and the parking spaces, which is stored in the memory, according to the detected leaving movement from the parking spaces or the detected parking movement of one or more other vehicles on the parking spaces.

* * * * *